INVENTORS
Herman T. Kraft
Fred H. Comey
BY Evans & McCoy
ATTORNEYS

INVENTORS
Herman T. Kraft
Fred H. Comey
BY Evans + McCoy
ATTORNEYS

Nov. 6, 1945.   H. T. KRAFT ET AL   2,388,421
PNEUMATIC TIRE
Filed June 23, 1942    5 Sheets-Sheet 5

INVENTORS
Herman T. Kraft
Fred H. Comey
BY Evans & McCry
ATTORNEYS

Patented Nov. 6, 1945

2,388,421

UNITED STATES PATENT OFFICE 2,388,421

PNEUMATIC TIRE

Herman T. Kraft and Fred H. Comey, Akron, Ohio, assignors to The General Tire & Rubber Company, Akron, Ohio, a corporation of Ohio Application June 23, 1942, Serial No. 448,056

10 Claims. (Cl. 152—352)

This invention relates to pneumatic tires for motor vehicles, and more particularly to a tire of transversely elongated cross-sectional form having a wide substantially cylindrical tread and adapted to replace the two tires of the dual wheel assemblies commonly used on heavy motor vehicles such as trucks. Tires with wide flat treads have been suggested but in so far as we are aware, no such tire has ever gone into commercial use.

The present invention has for its object to provide a tire of the character referred to which has superior cushioning and wearing qualities.

A further object of the invention is to provide a tire having a wide transversely flat tread which is adapted to operate with a relatively low inflation pressure.

A further object is to provide a tire which does not readily sink into sand or other soft soil because of the relatively large area of contact between the tire tread and the ground.

A further object is to provide a tire in which the flexing of the carcass during operation is slight and in which very little heat is generated during operation.

A further object is to provide a tire tread which has a minimum of wiping action on the ground surface and upon which the wear is distributed.

A further object of the invention is to provide a tire tread structure which is so designed as to take the major portion of the radial outward thrust due to internal air pressure and centrifugal force so that relatively light beads may be employed and the carcass side walls require relatively few plies of cord fabric and may be light and flexible.

A further object is to provide a pneumatic cord tire of the type in which a wide tread is held to substantially cylindrical form under inflation pressures and in which the flexing under imposed load is well distributed over the flexible side walls, and in which the carcass cords in the tire shoulders are held to a relatively large radius of curvature so that deterioration of the carcass fabric in the shoulder portions of the tire due to excessive flexing is minimized.

A further object of the invention is to provide a wide cylindrical tread which is positively held against radial expansion but which is flexible to permit the tread to envelop projections and irregularities on the ground surface without damage to the tire.

A further object is to so dispose the reinforcing cords in the tread portion of the tire so that local inward flexing of the tread can occur without subjecting any of the cords to excessive local tension, so that the tread fabric is not damaged during travel of the tire over a rough ground surface.

A further object of the invention is to provide a tire which is so designed that it can be built on a conventional tire building machine with relatively low cost for labor and which effects a saving in rubber, tire fabric, and bead wire over the two tires which the tire of the present invention is designed to replace.

With the above and other objects in view the invention may be said to comprise the tire as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which.

Figure 8:
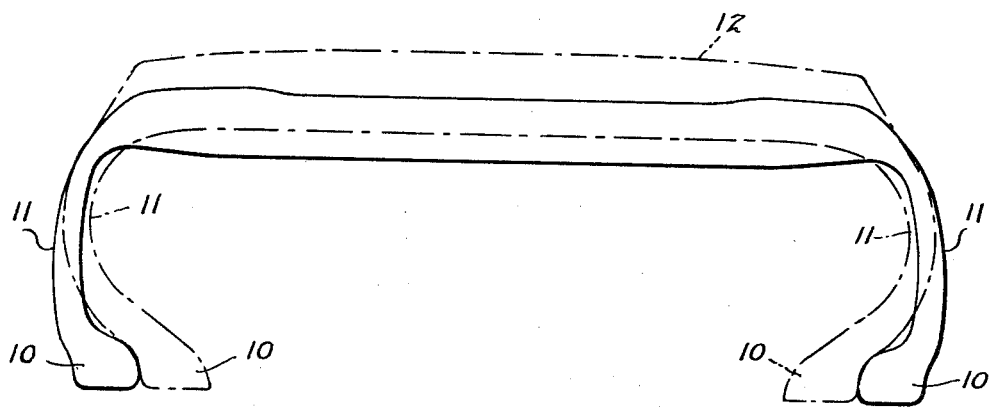
Figure 9:
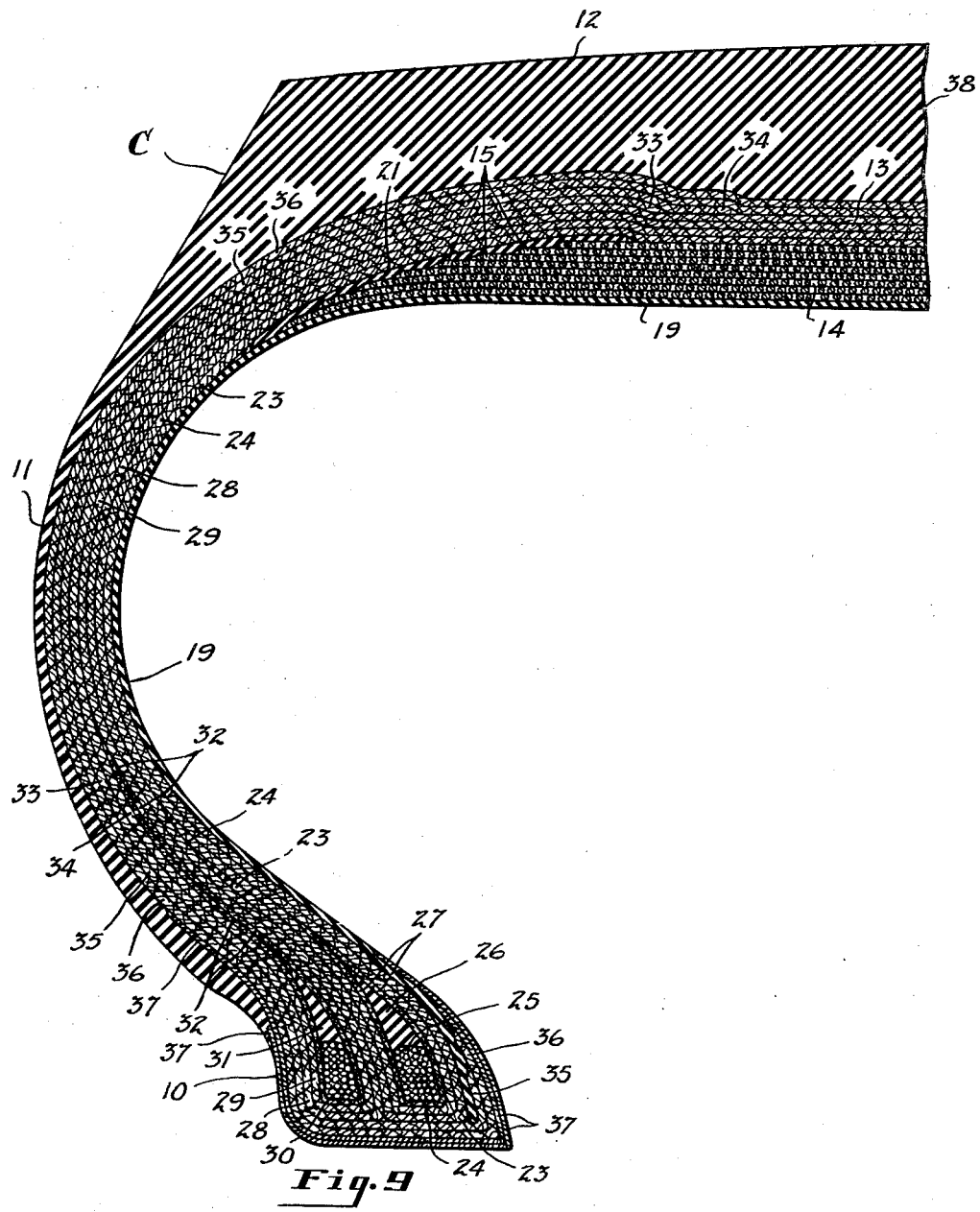
Figure 10:
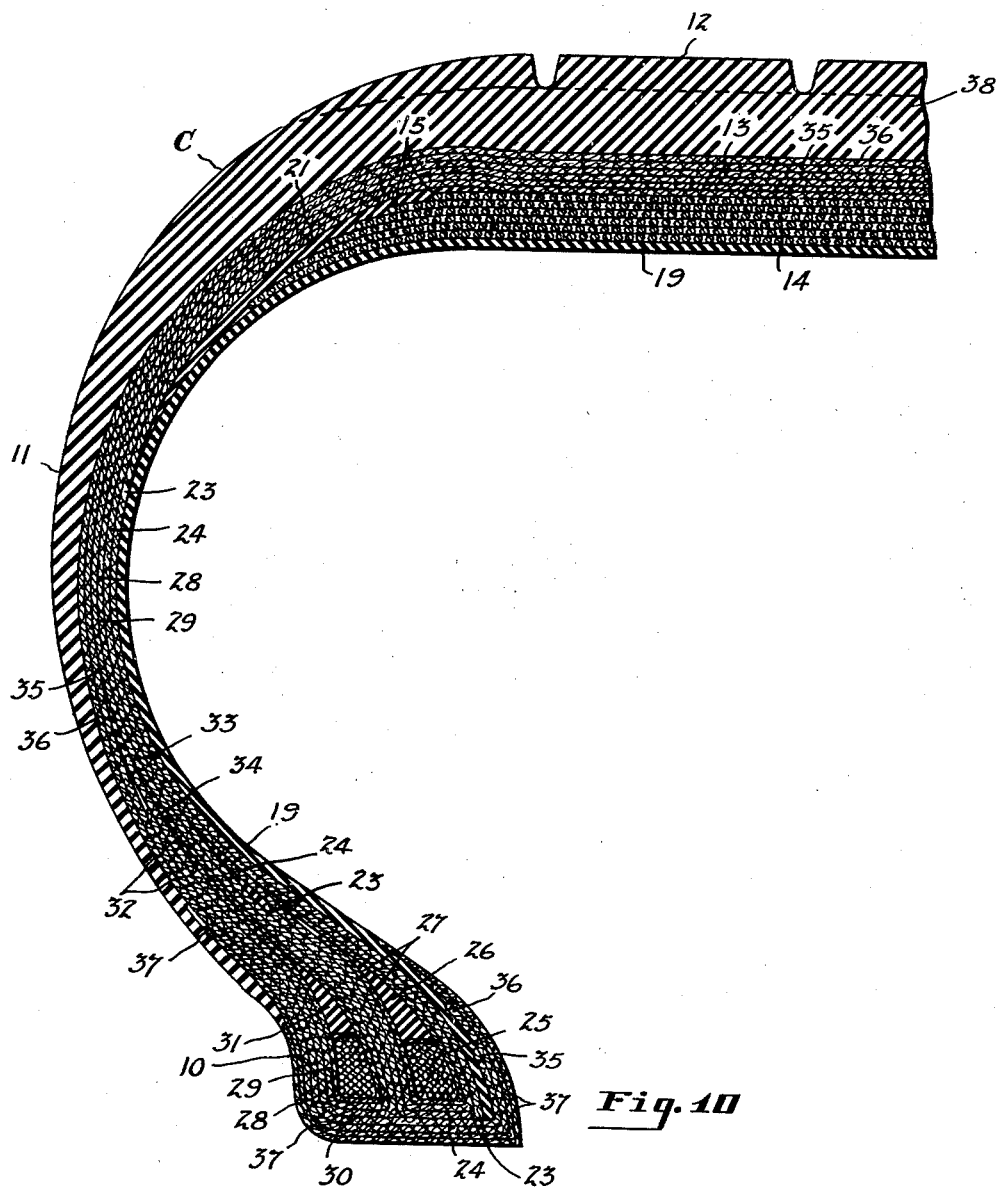

Fig. 8 is a diagrammatic sectional view showing the tire as built upon the drum in full lines, and the finished tire after vulcanization in a tire mold in dotted lines; and Fig. 9 is a transverse section through one side and shoulder of a tire showing this portion of the tire on a considerably enlarged scale; and Fig. 10 is a similar sectional view of modified form of tire embodying the present invention and found to be particularly effective in desert warfare.

Figure 1:
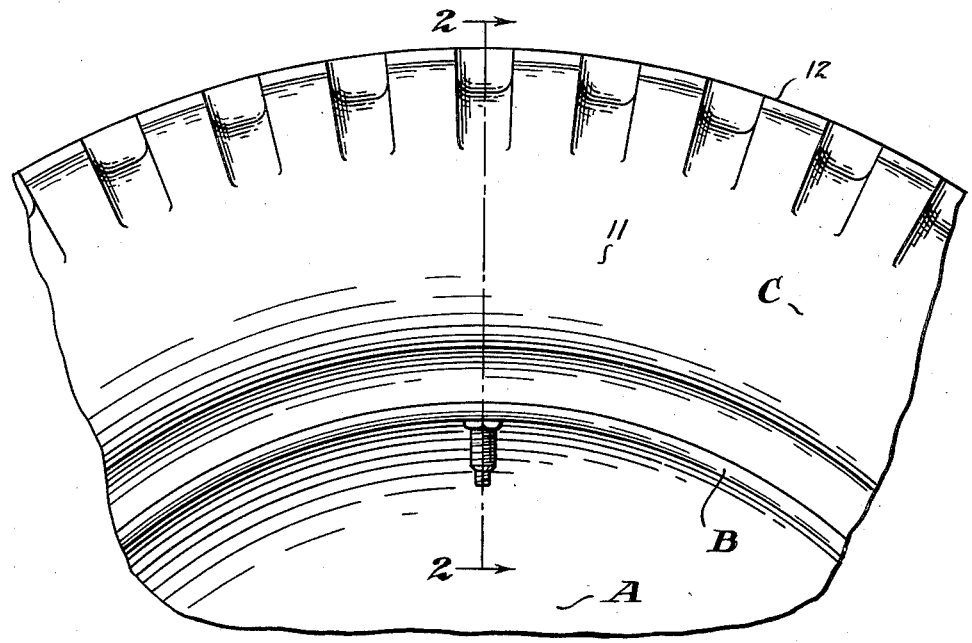
Figure 1 is a fragmentary side elevation showing a tire embodying the present invention and a portion of the wheel upon which it is mounted.
Figure 2:
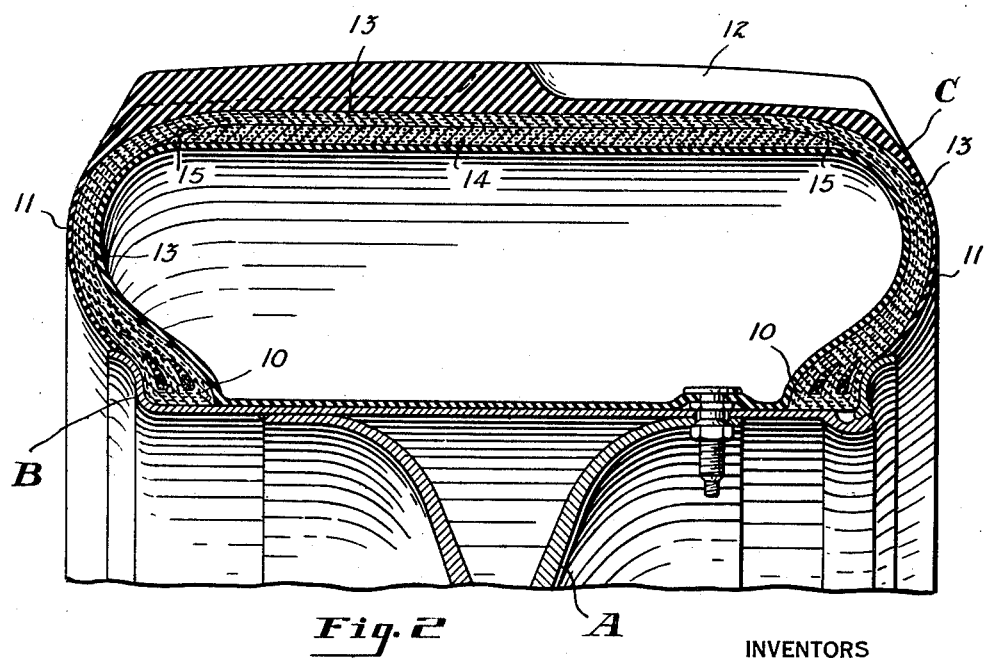
Fig. 2 is a radial cross section taken on the line indicated at 2—2 in Fig. 1.

In Figs. 1 and 2 of the drawings the tire of the present invention is shown mounted upon a wheel A which is provided with a rim B which is of a width generally corresponding to the distance between the inner flange of the inner rim and the outer flange of the outer rim of a dual wheel, and in the wide rim B there is mounted a pneumatic tire C of transversely elongated cross section which is of substantially the same radial depth as the tires of the dual wheel which is replaced by the wheel A and tire C, the tire C having a very wide transversely flat ground-engaging tread. The tire casing C has beads 10, side walls 11 which are relatively thin and flexible, and a wide flat tread 12 of substantial thickness. The tire casing C has a carcass comprising a series of superposed plies 13 of cord fabric, most of which have transverse cords extending from one bead of the tire to the other and a body of circumferential cords 14 in the cylindrical tread portion of the tire and disposed interiorly of the transverse cord plies 13. The side walls of the tire preferably have a larger number of transverse cord plies than are provided in the tread portion of the tire. Additional fabric plies may be built into the carcass side walls in any suitable way. The cords 14, because of the difference between longitudinal and cross sectional circumference, preferably have relatively lower stretch or lower extensibility than have the transverse cords. Thus the transverse cords may be of cotton and the circumferential cords of rayon which usually has a lower stretch than does cotton. The cords 14 are disposed in a series of layers within the plies of transverse cords and, as shown in Fig. 2, the circumferential cords are so disposed that the opposite edge portions 15 of the body of cords disposed in the shoulder portions of the tire have a gradual taper, bending inwardly and merging into the flexible side walls so that the transverse cord plies 13 have a substantially uniform curvature from the central portion of the side walls to a point well within the central cylindrical tread portion and the shoulder portions of the tire are effectively reinforced.

The positioning of the body of circumferential cords 14 internally of the main body of transverse cord plies is very important in the tires of the present invention because it permits a large radius of curvature in the transverse cords at the shoulder portion or at the juncture area of the transverse and circumferential cord bodies, so that abrupt changes in stress are reduced. Also, with the sides of the main body of circumferential cords tapered, as shown, the rate of change in curvature is still less and the transfer of stresses from the transverse cord plies to the circumferential cords occurs more gradually. The gum strips 21 and 22 of resilient rubber compound or of squeegee stock, one of which strips is positioned over each of the tapered end portions of the cord body 14, are also important for the same reasons.

The disposition of the main body or mass of circumferential cords internally of the transverse cords is essential in order to reduce stresses on the transverse cords due to bending when the tire passes over stones or projections in the road surface, etc. Thus, with all of the circumferential cords positioned internally of the body of transverse cord plies, the latter are at the neutral axis or relatively close to the neutral axis of the tire section and are, therefore, subject to but little change in stress upon flexing of the beam. The stress on the circumferential cords due to bumps and projections on the road surface is relatively small due both to the relatively large radius of circumferential curvature of the tire and to the ability of the cords to change their spacing by distortion of the rubber in which they are embedded without any appreciable stress upon the cords themselves. Thus, when the tire passes over a stone on the road, the rubber which joins the longitudinal cords stretches and thus effectively relieves the carcass cords of harmful localized stresses.

Figure 3:
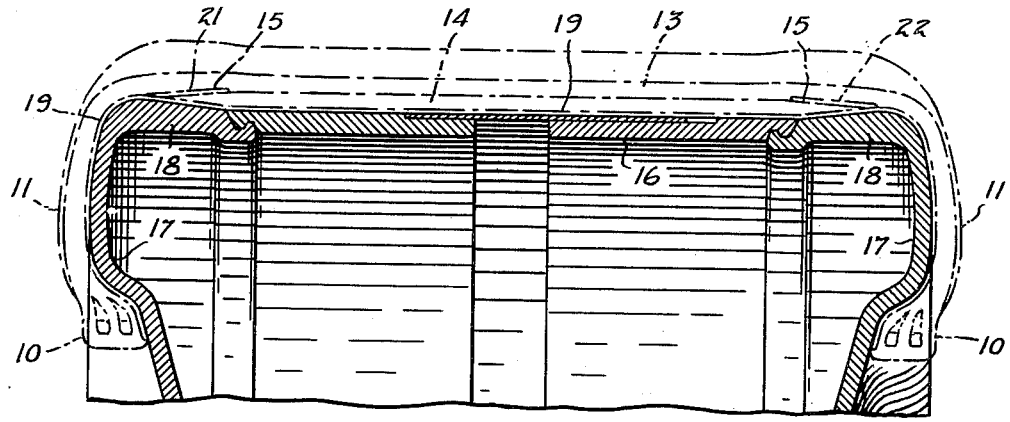
Fig. 3 is a fragmentary transverse section through a tire building drum which may be used for building the tire of the present invention, showing a tire on the drum.
Figure 5:
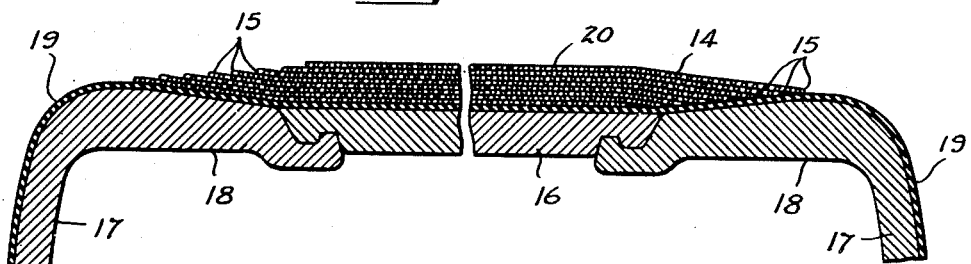
Fig. 5 is a section taken on the line indicated at 5—5 in Fig. 4.
Figure 6:
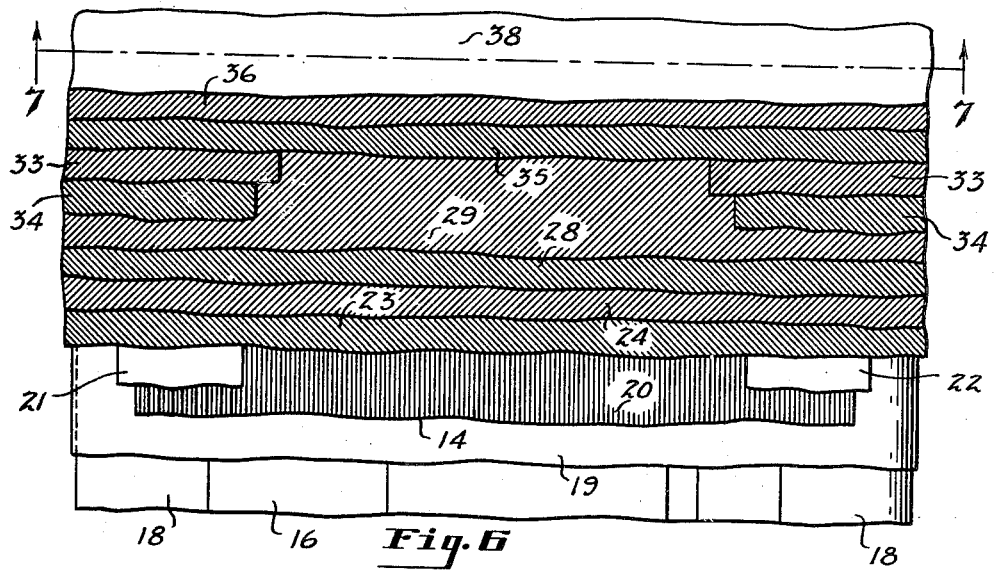
Fig. 6 is a fragmentary plan view of the tread portion of the tire with successive layers of rubber and fabric broken away to show the arrangement thereof.
Figure 7:
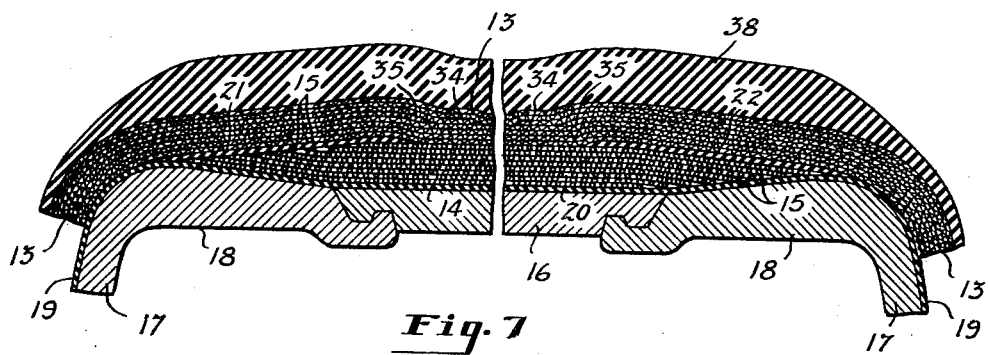
Fig. 7 is a fragmentary section taken on the line indicated at 7—7 in Fig. 6, with the central portion of the drum and tire tread broken away so as to show opposite shoulder portions of the tire on an enlarged scale.

As shown in Figs. 3 and 5, the tire of the present invention is built upon a suitable collapsible form or drum which has a central cylindrical body portion 16 and separable side shoulder portions 17. It will be understood that the body portion of the drum or form and the separable shoulder portions thereof are each formed of a series of separable sections or segments which can be collapsed and removed from the interior of a tire after the tire has been built upon the form or drum. The shoulder rings 17 are provided with inwardly tapering cylindrical flanges 18 which are joined to the cylindrical body portion 16 so as to form a slight depression in the periphery of the form or drum. In building a tire upon the drum, thin layer 19 of rubber is first laid upon the periphery and side flanges of the drum. This layer of rubber covers the interior of the tire carcass in the completed tire casing.

Figure 4:
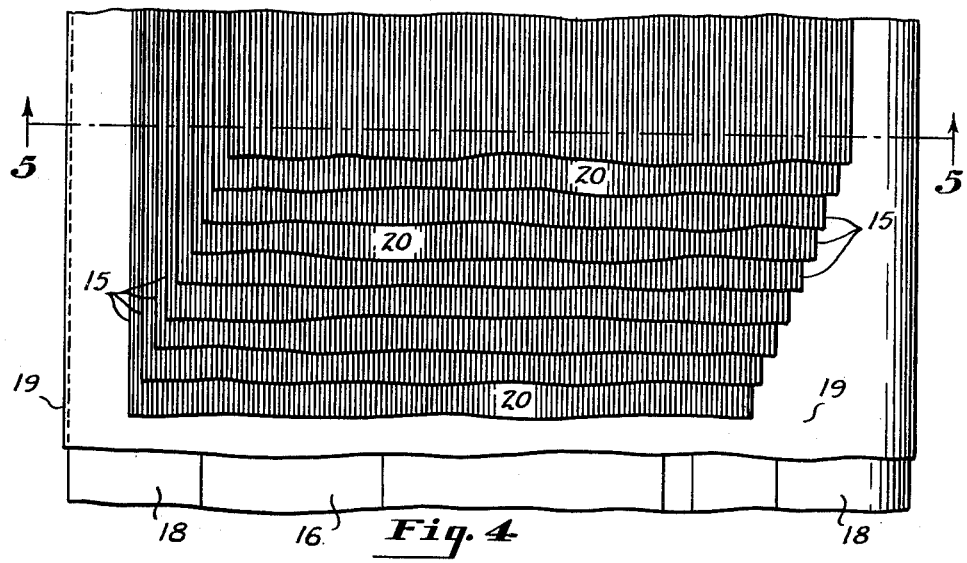
Fig. 4 is a fragmentary plan view with portions of the successive layers of fabric on the central portion of the drum broken away to show how the fabric is wound on the drum.

After application of the layer 19 of rubber on the surface of the drum or core, a strip 20 of rubber coated cord fabric is wound upon the drum in the depressed central portion thereof. The strip 20 is preferably a strip of fillerless cord fabric made by applying thin sheets of rubber to opposite sides of a sheet of spaced parallel cords in a rubber calendering machine. The cords of the strip 20 extend longitudinally of the strip and the width of the strip is somewhat greater than the width of the central band 16 of the drum. The strip 20 is wound in a series of convolutions spirally and helically upon the surface of the drum to offset successive turns laterally, one with respect to another, and provide the tapered edges 15 of the inner cord body as shown in Figs. 4 and 5 of the drawings. The circumferential cords 14 substantially fill the depression of the drum and build up the drum to substantially cylindrical form.

After the strip 20 has been wound upon the drum or core, thin strips 21 and 22 of squeegee stock are laid over the tapered edges of the circumferential cord layers, after which the transverse cord plies 13 are applied. The cord fabric forming the carcass plies 13 is bias cut cord fabric in which the cords extend diagonally from one bead to the other of the tire, successive plies being reversed so that the cords of successive plies are disposed in crossed relation.

For convenience of operation for building either carcass construction, the fabric may be applied to the drum or core in the form of endless two-ply bands which are formed in a separate machine and are adapted to be slipped endwise over the tire building drum and then stitched down over the sides of the drum. The free edges of the plies and flipper strips outwardly of the beads are preferably separated from the adjacent fabric plies by thin filler strips of rubber applied during the tire building operation. The inner band consists of plies 23 and 24 which are folded outwardly around inner bead wires 25. The inner ply 23 of the band is slightly wider than the outer ply 24, and the width of the band is such that the free ends of the bands may be folded over the bead wire rings 25 and rubber filler strips 26 which are enclosed within a cord fabric flipper strip 27. The free edges of the plies 23 and 24 extend beyond the edges of the flipper strips 27 and the edges of the flipper strips and the plies 23 and 24 are stitched together and to the outer surface of the ply 24. Suitable strips of rubber overlie each edge of each ply to prevent internal stress concentrations at these points. The second fabric band consists of two plies 28 and 29 which have edge portions folded outwardly over outer bead wire rings 30. The rings 30 and filler strips 31 of rubber are enclosed within cord fabric flipper strips 32, which are considerably wider than the inner flipper strip 27 and extend slightly past the free ends of the plies 23 and 24. The plies 28 and 29 are of sufficient width to provide free edge portions which extend far enough past the bead rings 30 to be folded back upon the side wall of the tire and extend over the shoulder and substantially to the central cylindrical portion of the tire carcass. These folded back edges of the plies 28 and 29 provide two additional plies 33 and 34 in the side walls of the tire. The outer band consists of plies 35 and 36 which have edge portions folded inwardly over the base of the bead rings 25 and 30 with their free edges turned outwardly within the toe of the bead.

Chafer strips 37 of suitable woven fabric may be provided to cover the bead portions of the tire and protect the same against wear by frictional engagement with the wheel rim. A suitable relatively thick rubber tread 38 is applied to the periphery of the tire and this tread may have a suitable rib and groove configuration to provide resistance to slippage on the ground surface.

The fabric forming the transverse cord plies may be cut at a bias angle of anywhere from 30° to 52° relative to the cords but the higher angles are preferred, it having been found that superior performance is obtained by disposing the transverse reinforcing cords at a somewhat higher angle than is commonly employed in tire building. The cord fabric forming the body 14 of circumferential cords is preferably a conventional cord tire fabric in which the cords are closely spaced. The body of transverse cords 13 are preferably formed by superimposing plies of cord fabric in which the cords are spaced somewhat farther apart than in the strip 20. It has been found that an excellent tire is produced by using a rayon cord fabric having 26 ends per inch for forming the body of circumferential cords 14 and a cotton cord fabric having approximately 20 ends per inch for forming the body of transverse cords 13. The low cord count in the transverse plies is desirable because the tires of the present invention are substantially core built and need not be expanded or shaped prior to their incorporation in the mold. The spreading of the cords during expansion is eliminated and the cord angle and the cord spacing, therefore, remains substantially the same as in the original fabric. All cords employed are conventional tire cords of small diameter, such cords being usually between about .025" and about .035" in diameter, the rayon cords usually being smaller than the cotton.

Although the tires of the present invention do not require heavy side walls, the stresses set up in the side walls during operation of the tires tends to cause bead rocking and excessive flexing of the inner portions of the side walls. Such stresses are not effectively resisted by the ordinary single bead ring. In order to effectively resist the stresses tending to rock the beads, it is desirable that relatively wide beads be provided. As herein shown, the beads are of the type in which a plurality of inextensible wire rings are disposed side by side.

The tire is expanded and stretched in the vulcanizing mold by means of an air bag inflated by internal fluid pressure to stretch all of the fabric carcass, about 5%, the configuration of the tire being changed in the vulcanizing mold from that of the full lines shown in Fig. 8 to that shown in dotted lines in said figure. This initial stretching of the carcass fabric has been found to be advantageous in that it enables the carcass to hold the tire to the form in which it is vulcanized when inflated and prevents objectionable expansion of the tread during operation due to inflation pressure or centrifugal force.

The body 14 of circumferential cords offers a strong resistance to radial expansion of the tread under air pressure or centrifugal force, and by reason of the fact that these cords are disposed interiorly of the transverse cords none of the cords are subjected to severe tension by inward bending of portions of the tread. The parallel longitudinal cords on the interior of the tire will readily spread apart to permit stretching of the interior surface of the tire when the tread is bent inwardly and the transverse cords 13 are disposed far enough from the interior surface of the tire to be in a substantially neutral zone where there is little added tension in the tread body due to flexing.

The tire illustrated in Fig. 10 is particularly desirable for use in desert warfare operation or for use by vehicles which are to operate over sand and rocky areas. In this modification, as will be seen from the drawings, the tread portion is relatively thinner than that of a conventional tire and the tread merges with a relatively smooth curve into the side wall of the tire. By tapering the edge portions of the tread, as shown, the customary abrupt shoulder is eliminated and a relatively heavy layer of tread rubber extends to substantially the middle of the side wall of the tire, so that when the tire is deflected to the most extreme condition, the side wall is protected by tread rubber. Puncture by rocks and sharp objects is therefore less likely to occur.

Since in desert warfare operation the tire is often subjected to extreme conditions of flexing, the side wall of the tire is preferably relatively thin and in the tire preferred for such use the number of transverse plies in the side wall area is reduced to a minimum. In the modification shown, the respective plies 23, 24, 28, 29, 35, and 36 are composed of rayon cord fabric, the cords having relatively small diameter and, preferably, a lower extensibility than the circumferential cords 14, which may also be of rayon. In this modification the edges 33 and 34 of the respective plies 28 and 29 do not extend beyond the middle of the side wall portion of the tire as the tread rubber thereafter provides some reinforcing effect.

The tire of the present invention has been found to be very useful for use on army tanks and trucks which operate largely over open country and on sand and other soft soil. The large area of contact with the road surface enables the tire to operate with low inflation pressure and insures excellent traction. The cylindrical form of the tread reduces the wiping action of the tread surface on the ground surface, with the result that there is less wearing away of rubber on the tread surface and the tread wear is more uniform.

By reason of the strength of the tread portion of the tire and the fact that the circumferential reinforcing cords resist the outward pull due to internal air pressure and centrifugal force, the side walls of the tire may be made relatively light with fewer plies of fabric than would ordinarily be employed for a given load capacity, and since the flexing of the tire during operation occurs almost entirely in the thin side walls, there is very little heat generated in the tire carcass during operation.

The tire of the present invention effects a material saving in rubber and tire fabric over the two tires which are replaced by the tire of the present invention.

It is to be understood that variations and modifications of the specific devices herein shown and described for purposes of illustration, may be made without changing the spirit of the invention, and it is intended that the invention be limited only by the appended claims.

What we claim is:

1. In a structurally integral pneumatic tire casing vulcanized in one piece and having beads, flexible side walls and a wide flexible but inextensible tread of substantially cylindrical form, a series of layers of transverse cords embedded in the rubber of the tire casing and extending from bead to bead, and a series of layers of circumferential cords embedded in the rubber of the tire casing in the cylindrical portion thereof interiorly of the transverse cords to hold said cylindrical portion against radial expansion, said circumferential cords being free to separate transversely from each other upon transverse stretching of the rubber in which they are embedded.

2. In a structurally integral pneumatic tire casing vulcanized in one piece and having beads, flexible side walls and a wide flexible but inextensible tread of substantially cylindrical form, a carcass composed of a series of layers of transverse cords extending from bead to bead, other layers of transversely extending cords extending from the beads to the opposite edge portions of the tread, and a series of layers of circumferential cords in the cylindrical tread portion of the casing and disposed interiorly of the transverse cords to hold said cylindrical portion against radial expansion, all of said cords being embedded in the rubber of the tire casing, said circumferential cords being free to separate transversely from each other upon transverse stretching of the rubber in which they are embedded.

3. In a structurally integral pneumatic tire casing vulcanized in one piece and having beads, flexible side walls and a wide flexible but inextensible tread of substantially cylindrical form, a carcass composed of superposed plies of cord fabric, each ply having parallel cords extending transversely from bead to bead, and a strip of cord fabric having parallel longitudinal cords wound spirally to provide a series of layers of cords within the transverse cord plies in the cylindrical portion of the tire, said circumferential cords being free to separate transversely from each other upon transverse stretching of the rubber in which they are embedded.

4. In a pneumatic tire casing having beads, flexible side walls and a wide flexible but inextensible tread of substantially cylindrical form, a carcass composed of superposed plies of cord fabric, each ply having parallel cords extending transversely from bead to bead, and a strip of cord fabric having parallel longitudinal cords wound spirally to provide a series of layers of cords within the transverse cord plies in the cylindrical portion of the tire, the convolutions of said strip being progressively offset laterally to provide stepped edges in the shoulder portions of the tire.

5. In a structurally integral pneumatic tire casing vulcanized in one piece and having beads which have relatively wide inextensible base portions, flexible side walls and a wide flexible but inextensible tread of substantially cylindrical form, a series of layers of transverse cords embedded in the rubber of the tire casing and extending from bead to bead, and a series of layers of circumferential cords embedded in the rubber of the tire casing in the cylindrical portion thereof interiorly of the transverse cords to hold said cylindrical portion against radial expansion, said circumferential cords being free to separate transversely from each other upon transverse stretching of the rubber in which they are embedded.

6. In a structurally integral pneumatic tire casing vulcanized in one piece and having beads, flexible side walls and a wide substantially cylindrical tread, superposed layers of transverse cords extending from bead to bead, additional layers of transversely extending cords in the side walls of the tire casing, a body of circumferential cords disposed interiorly of the transverse cords and extending throughout the width of the tread, said body of circumferential cords having tapered edge portions within the shoulder portions of said tire casing, a gum strip over each tapered portion of said circumferential cord body between said taper portion and the body of said superimposed layers of transverse cords, whereby a gradual curvature of said transverse cords in the shoulder portion of the tire is obtained and abrupt changes of stress in said transverse cords are reduced, said circumferential cords being free to separate transversely from each other upon transverse stretching of the rubber in which they are embedded.

7. In a pneumatic tire casing having beads, flexible side walls and a wide substantially cylindrical tread, superposed layers of transverse cords extending from bead to bead, additional layers of transversely extending cords in the side walls of the tire casing, a body of circumferential cords disposed interiorly of the transverse cords and extending throughout the width of the tread, said circumferential cords having substantially lower stretch than said transverse cords, said body of circumferential cords having tapered edge portions within the shoulder portions of said tire casing, a gum strip over each tapered portion of said circumferential cord body between said taper portion and the body of said superimposed layers of transverse cords, whereby a gradual curvature of said transverse cords in the shoulder portion of the tire is obtained and abrupt changes of stress in said transverse cords are reduced.

8. In a structurally integral pneumatic tire casing vulcanized in one piece and having beads, flexible side walls and a wide substantially cylindrical tread, superposed layers of transverse cords extending from bead to bead, additional layers of transversely extending cords in the side walls of the tire casing, a body of circumferential cords disposed interiorly of the transverse cords and extending throughout the width of the tread, said circumferential cords being of rayon and said transverse cords being cotton, said body of circumferential cords having tapered edge portions within the shoulder portions of said tire casing, a gum strip over each tapered portion of said circumferential cord body between said taper portion and the body of said superimposed layers of transverse cords, whereby a gradual curvature of said transverse cords in the shoulder portion of the tire is obtained and abrupt changes of stress in said transverse cords are reduced, said circumferential cords being free to separate transversely from each other upon transverse stretching of the rubber in which they are embedded.

9. A structurally integral pneumatic tire casing vulcanized in one piece and having beads, flexible side walls, a wide substantially cylindrical tread, the edges of which merge into said side walls with relatively uniform curvature so as to provide a relatively thick tapered layer of wear-resistant rubber covering the outer portion of said side walls and extending from the median portion thereof, superposed layers of transverse cords extending from bead to bead, additional layers of transversely extending cords in the side walls of the tire casing, a body of circumferential cords disposed interiorly of the transverse cords and extending throughout the width of the tread, said body of circumferential cords having tapered edge portions within the shoulder portions of said tire casing, a gum strip over each tapered portion of said circumferential cord body between said taper portion and the body of said superimposed layers of transverse cords, whereby a gradual curvature of said transverse cords in the shoulder portion of the tire is obtained and abrupt changes of stress in said transverse cords are reduced, said circumferential cords being free to separate transversely from each other upon transverse stretching of the rubber in which they are embedded.

10. A structurally integral pneumatic tire casing vulcanized in one piece and having beads, flexible side walls, a wide substantially cylindrical tread, the edges of which merge into said side walls with relatively uniform curvature so as to provide a relatively thick tapered layer of wear-resistant rubber covering the outer portion of said side walls and extending from the median portion thereof, superposed layers of transverse cords extending from bead to bead, additional layers of transversely extending cords in the side walls of the tire casing, a body of circumferential cords disposed interiorly of the transverse cords and extending throughout the width of the tread, said transverse and said circumferential cords being of rayon, said transverse cords being of smaller diameter than said circumferential cords, said body of circumferential cords having tapered edge portions within the shoulder portions of said tire casing, a gum strip over each tapered portion of said circumferential cord body between said taper portion and the body of said superimposed layers of transverse cords, whereby a gradual curvature of said transverse cords in the shoulder portion of the tire is obtained and abrupt changes of stress in said transverse cords are reduced, said circumferential cords being free to separate transversely from each other upon transverse stretching of the rubber in which they are embedded.

HERMAN T. KRAFT.
FRED H. COMEY.